(12) United States Patent
Almeida et al.

(10) Patent No.: US 10,375,887 B2
(45) Date of Patent: Aug. 13, 2019

(54) SYNCHRONIZER FOR SUGARCANE KNOCKDOWN ROLLER

(71) Applicant: Deere & Company, Moline, IL (US)

(72) Inventors: Kent M. Almeida, Napoleonville, LA (US); Michael L. Halbrook, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 85 days.

(21) Appl. No.: 15/387,899

(22) Filed: Dec. 22, 2016

(65) Prior Publication Data

US 2018/0177132 A1 Jun. 28, 2018

(51) Int. Cl.
*A01D 45/10* (2006.01)

(52) U.S. Cl.
CPC .................................. *A01D 45/10* (2013.01)

(58) Field of Classification Search
CPC ........ A01D 67/00; A01D 45/10; A01D 75/00; A01D 41/148; A01D 57/04
See application file for complete search history.

(56) References Cited

U.S. PATENT DOCUMENTS

| 2,532,904 | A | * | 12/1950 | Guild | A01D 45/10 56/11.9 |
| 3,434,271 | A | * | 3/1969 | Fogels | A01D 45/10 56/13.8 |
| 3,492,798 | A | * | 2/1970 | Hart | A01D 45/10 56/10.7 |
| 3,665,686 | A | * | 5/1972 | Duncan | A01D 45/10 56/11.3 |
| 3,683,748 | A | * | 8/1972 | Mahl | A01D 57/04 91/416 |
| 4,386,492 | A | * | 6/1983 | Tilby | A01D 45/10 56/13.9 |
| 4,471,602 | A | * | 9/1984 | Leigers | A01D 45/10 241/285.2 |
| 5,752,372 | A | * | 5/1998 | Buermann | A01D 41/148 56/10.2 E |
| 6,272,819 | B1 | | 8/2001 | Wendte et al. | |
| 6,500,062 | B1 | | 12/2002 | Harris et al. | |
| 8,230,668 | B2 | | 7/2012 | Hinds | |
| 8,230,669 | B2 | | 7/2012 | Hinds | |
| 8,578,688 | B2 | | 11/2013 | Hinds | |
| 8,955,402 | B2 | | 2/2015 | Quaderer et al. | |
| 2012/0110969 | A1 | | 5/2012 | Hinds | |
| 2015/0331408 | A1 | | 11/2015 | Richard | |

FOREIGN PATENT DOCUMENTS

CN 105123117 A 12/2015
CN 105409439 A 3/2016

OTHER PUBLICATIONS

Basecutter Height Adjustment Statement (1 page) (prior art before Dec. 22, 2016).

* cited by examiner

*Primary Examiner* — Alicia Torrres
*Assistant Examiner* — Adam J Behrens

(57) ABSTRACT

A sugarcane harvester comprises a frame, a basecutter coupled to the frame for translation relative to the frame, a knockdown roller mounted for translation relative to the frame, and a synchronizer configured to translate the knockdown roller in unison with the basecutter so as to maintain a position of the knockdown roller relative to the basecutter upon translation of the basecutter relative to the frame.

5 Claims, 7 Drawing Sheets

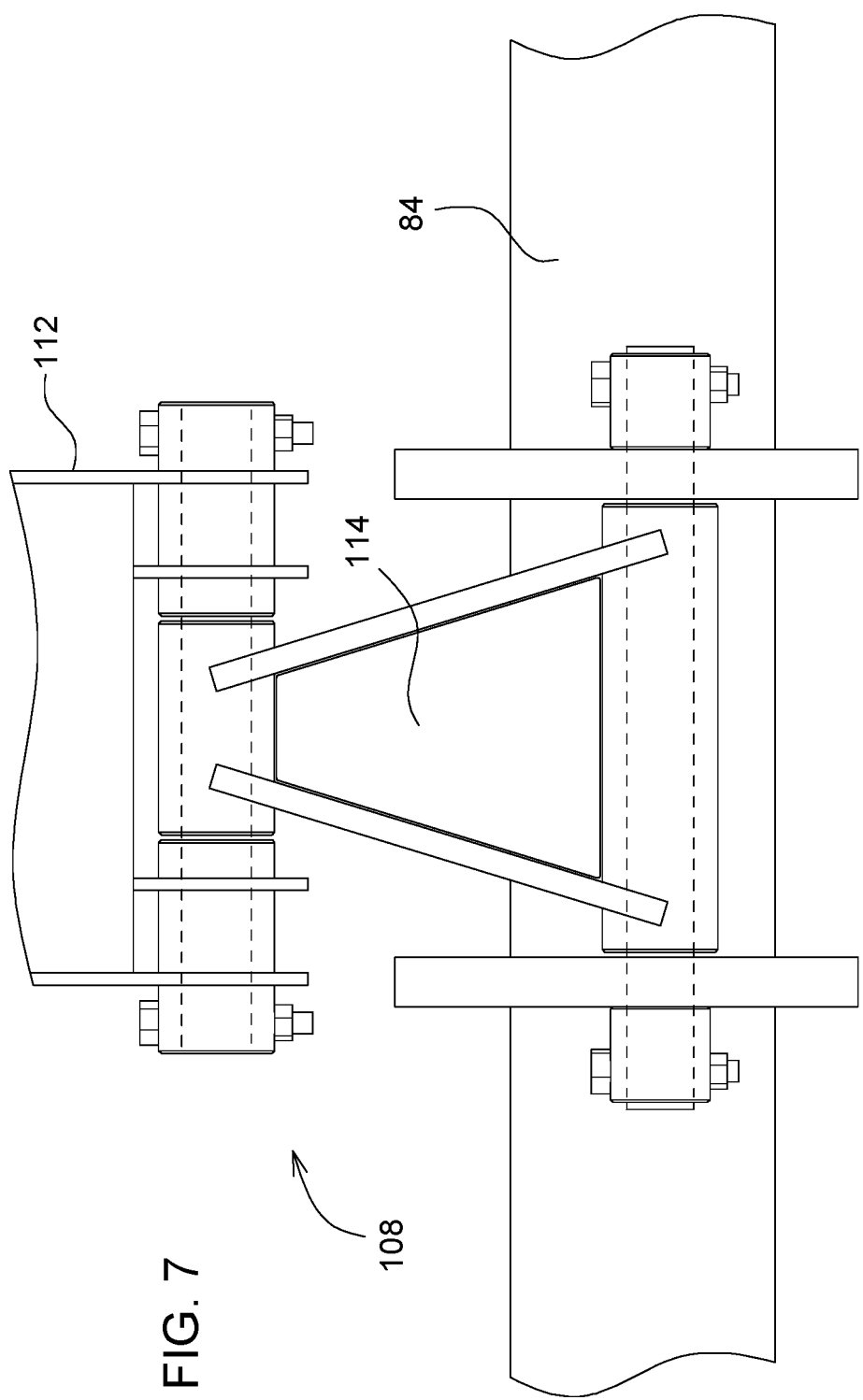

US 10,375,887 B2

SYNCHRONIZER FOR SUGARCANE KNOCKDOWN ROLLER

FIELD OF THE DISCLOSURE

The present disclosure relates to a sugarcane harvester, and, more particularly, to a position of a knockdown roller of a sugarcane harvester.

BACKGROUND OF THE DISCLOSURE

A sugarcane harvester comprises a basecutter, an upper knockdown roller, and a lower knockdown roller. The knockdown rollers are configured to lean sugarcane over enough to expose the base of the stalk to the basecutter. The basecutter is configured to sever the sugarcane stalk at the base thereof near the ground.

SUMMARY OF THE DISCLOSURE

According to an aspect of the present disclosure, a sugarcane harvester comprises a frame, a basecutter coupled to the frame for translation relative to the frame, a knockdown roller mounted for translation relative to the frame, and a synchronizer configured to translate the knockdown roller in unison with the basecutter so as to maintain a position of the knockdown roller relative to the basecutter upon translation of the basecutter relative to the frame.

The above and other features will become apparent from the following description and accompanying drawings.

BRIEF DESCRIPTION OF THE DRAWINGS

The detailed description of the drawings refers to the accompanying figures in which:

FIG. 7 is a view taken in a direction A of FIG. 6 showing a synchronizer link included, for example, in the synchronizer.

DETAILED DESCRIPTION OF THE DRAWINGS

Figure 1:
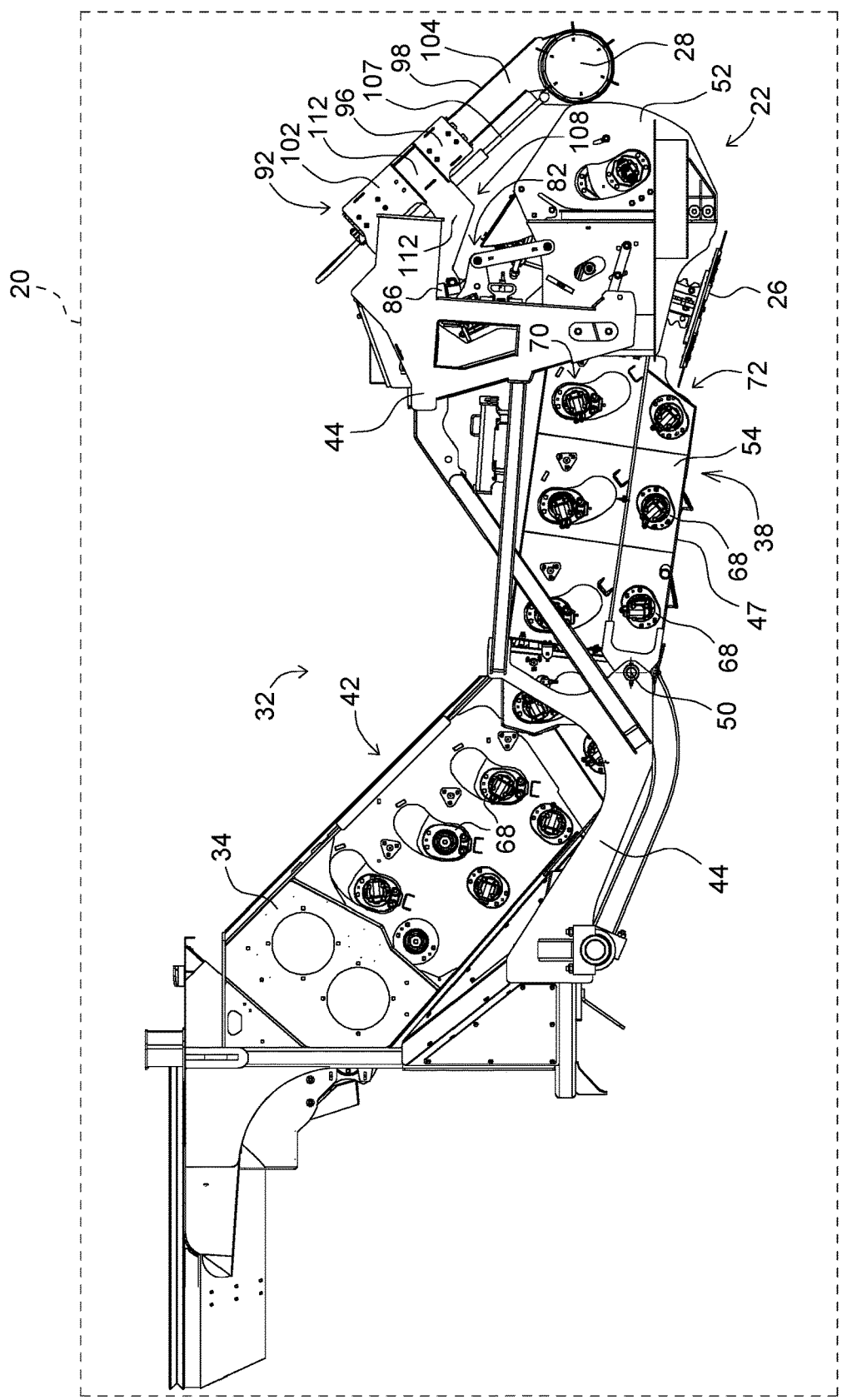
FIG. 1 is a side elevation view showing a sugarcane harvester which comprises an inlet section configured to sever a row of sugarcane, a feed section configured to receive from the inlet section a mat of sugarcane, and a chopping section configured to cut the mat received from the feed section into billets.

Referring to FIG. 1, a sugarcane harvester 20 is configured to harvest a row of sugarcane. The harvester 20 is configured to process the harvested sugarcane into billets.

The harvester 20 comprises an inlet section 22 for the row. The inlet section 22 comprises two crop divider scroll (not shown), one on each side of the inlet section 22. The scrolls are configured to lift sugarcane stalks before being severed. The harvester 20 may also comprise a separator scroll (not shown) on one or both sides of the inlet section 22 laterally outward from the respective crop divider scroll, such separator scroll being configured to separate an adjacent row of uncut sugarcane from the respective row to be cut.

Figure 2:
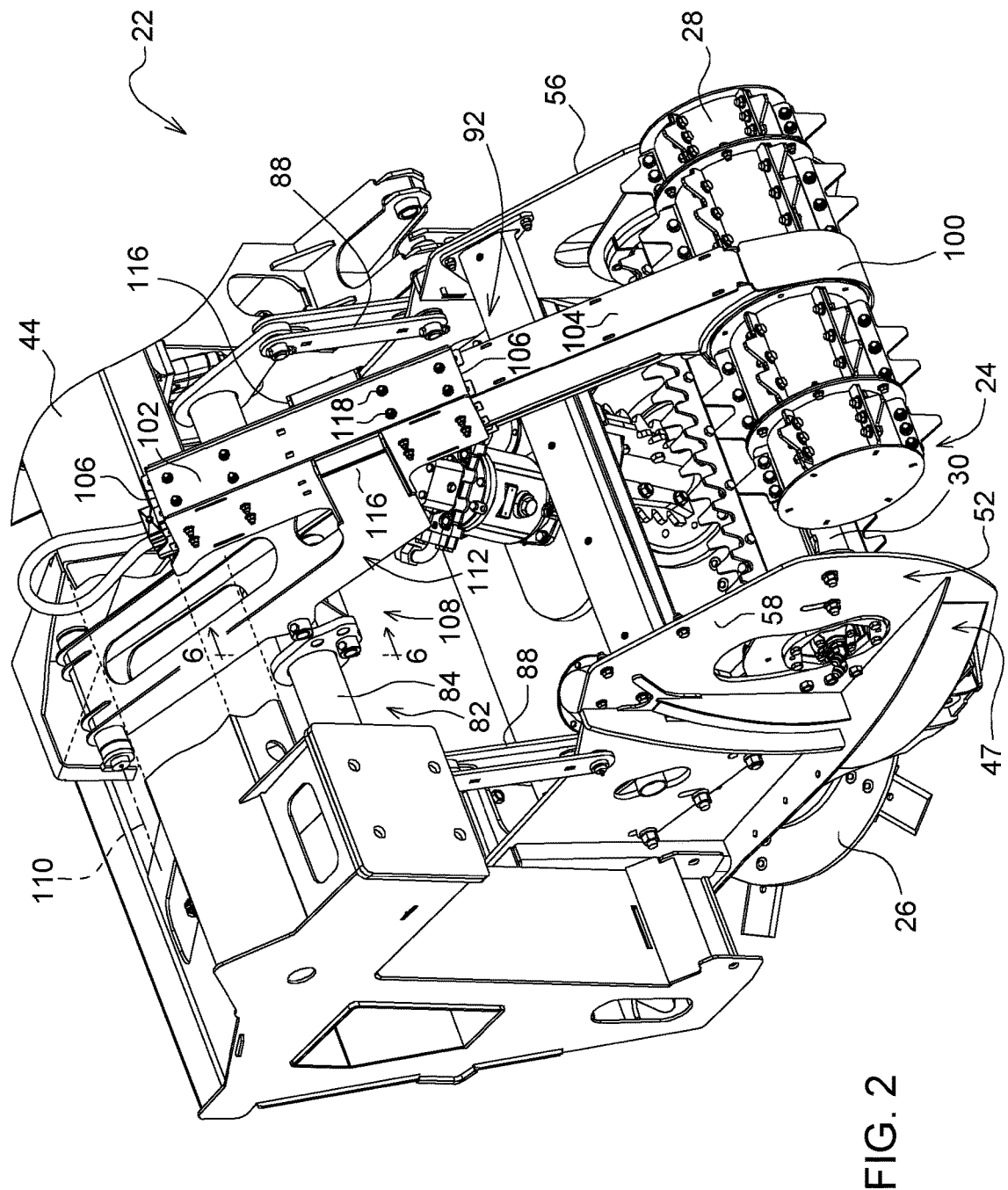
FIG. 2 is a perspective view showing an inlet section of the sugarcane harvester, with portions broken away (including, for example, a shield for a basecutter motor)

Referring to FIGS. 1 and 2, the inlet section 22 comprises a set 24 of knockdown rollers and a basecutter 26. The set 24 comprises an upper knockdown roller 28 and a lower knockdown roller 30. The knockdown rollers 28, 30 are positioned ahead of the basecutter 26 and configured to lean the sugarcane over enough to expose the base of the stalk to the basecutter 26. Each basecutter 26 comprises a pair of counter-rotating cutting disks driven by a motor (e.g., hydraulic motor shown, for example, in FIG. 2) and comprising knives spaced about their periphery. The cutting disks cooperate with one another to sever the sugarcane stalk at the base thereof near the ground. The harvester 20 may comprise a topper (not shown) for the row to cut off leafy material from the sugarcane before engagement with the knockdown roller set 24.

The harvester 20 comprises a feed section 32, a chopping section 34, a primary extractor (the frame of which is shown), an elevator (not shown), and, in some embodiments, a secondary extractor (not shown). The feed section 32 is configured to receive from the basecutter 14 a mat of severed sugarcane and to feed the mat rearwardly. The chopping section 34 is configured to receive the mat from the feed section 32 and cut the sugarcane stalk into billets. The primary extractor is positioned downstream from the chopping section 34 and is configured to separate crop residue (e.g., leafy material) from the billets and remove that crop residue from the harvester 20. The elevator is positioned at the rear of the harvester 20 to receive the cleaned flow of billets and is configured to convey the billets to an elevated position where they are discharged into a wagon to be hauled away. The secondary extractor (if present) is positioned near the top of the elevator and is configured to separate further crop residue from the billets and remove the crop residue from the harvester 20.

The harvester 20 comprises an operator's station 36 (FIG. 10) and traction elements (not shown). A human operator can operate the harvester 20 from the operator's station 36. The traction elements are positioned on opposite sides of the harvester 20 for engaging the ground and propelling the harvester 20. Each traction element may be, for example, a track unit or a ground-engaging wheel (e.g., one track unit on each side of the left and right sides of the harvester 20).

Referring to FIG. 1, the feed section 32 comprises a feed train 38 and a feed train 42. The feed train 38 is configured to advance a mat of sugarcane received from the row of sugarcane in a feed direction toward the feed train 42. The basecutter 26 is configured to sever the mat, and the feed train 38 is configured to receive the severed mat from the basecutter 26 into a mouth of the feed train 38 such that the basecutter 26 is positioned between the set 24 of knockdown rollers and the mouth of the feed train 38.

The harvester 20 comprises a frame 44 and a frame 47. The frame 44 is, for example, the main frame of the harvester 20. The frame 47 is coupled pivotally to the frame 44 for pivotal movement about a pivot axis 50 in response to operation of an actuator 86 (discussed in more detail herein).

The frame 47 comprises a frame inlet portion 52 included in the inlet section 22 and a frame feed portion 54 included in the feed train 38. Mounted to the frame inlet portion 52 are the basecutter 26 and the lower knockdown roller 30. The basecutter 26 and the lower knockdown roller 30 are mounted to (e.g., bolted) and between a first side wall 56 of the frame inlet portion 52 and a second side wall 58 of the frame inlet portion 52. The basecutter 26 and the lower knockdown roller 30 are mounted to the frame inlet portion 52 in that their axes of rotation are stationary relative thereto.

The frame inlet portion 52 is coupled to the frame feed portion 54. The first and second side walls 56, 58 are fixed (e.g., bolted) to the feed portion 54. The frame feed portion 54 is coupled pivotally to the frame 44 for pivotal movement about the pivot axis 50 in response to operation of the actuator 86.

The feed section 32 comprises feed rollers 68 driven to advance the sugarcane to the chopping section 34. The feed rollers 68 in each feed train 38, 42 are arranged in an upper rank 70 of feed rollers 68 and a lower rank 72 of feed rollers 68. Each feed roller 68 has an axis of rotation about which the feed roller 68 is rotatable. Each feed roller 68 is driven to rotate about its axis of rotation by a respective motor, which is a hydraulic motor, although in other embodiments it could take the form of, for example, an electric motor or other suitable drive device. Each feed roller 68 of the feed trains 38, 42 is mounted to the respective frame 44, 47. With respect to the feed train 38, the first three feed rollers 68 of each of the upper rank 70 and the lower rank 72 (starting from the front near the basecutter 26) are mounted to the frame 47 so as to pivot therewith about the pivot axis 50, and the fourth feed rollers 68 of each of the upper rank 70 and the lower rank 72 (i.e., the feed rollers 68 closest to the feed train 42) are mounted to the frame 44 so as not to pivot about the pivot axis 50. With respect to the feed train 42, the feed rollers 68 of the upper rank 70 and the lower rank 72 are mounted to the frame 44 so as not to pivot about the pivot axis 50.

Referring to FIG. 2, the basecutter 26 is coupled to the frame 44 for translation relative to the frame 44. As alluded to herein, the basecutter 26 is illustratively coupled to the frame 44 for pivotal movement about the pivot axis 50. The basecutter 26 is mounted to the frame 47 (e.g., bolted) such that the axes of rotation of the cutting disks of the basecutter 26 are stationary relative to the frame 47 so as to be pivotable or otherwise translatable relative to the frame 44 about the pivot axis 50.

Figure 3:
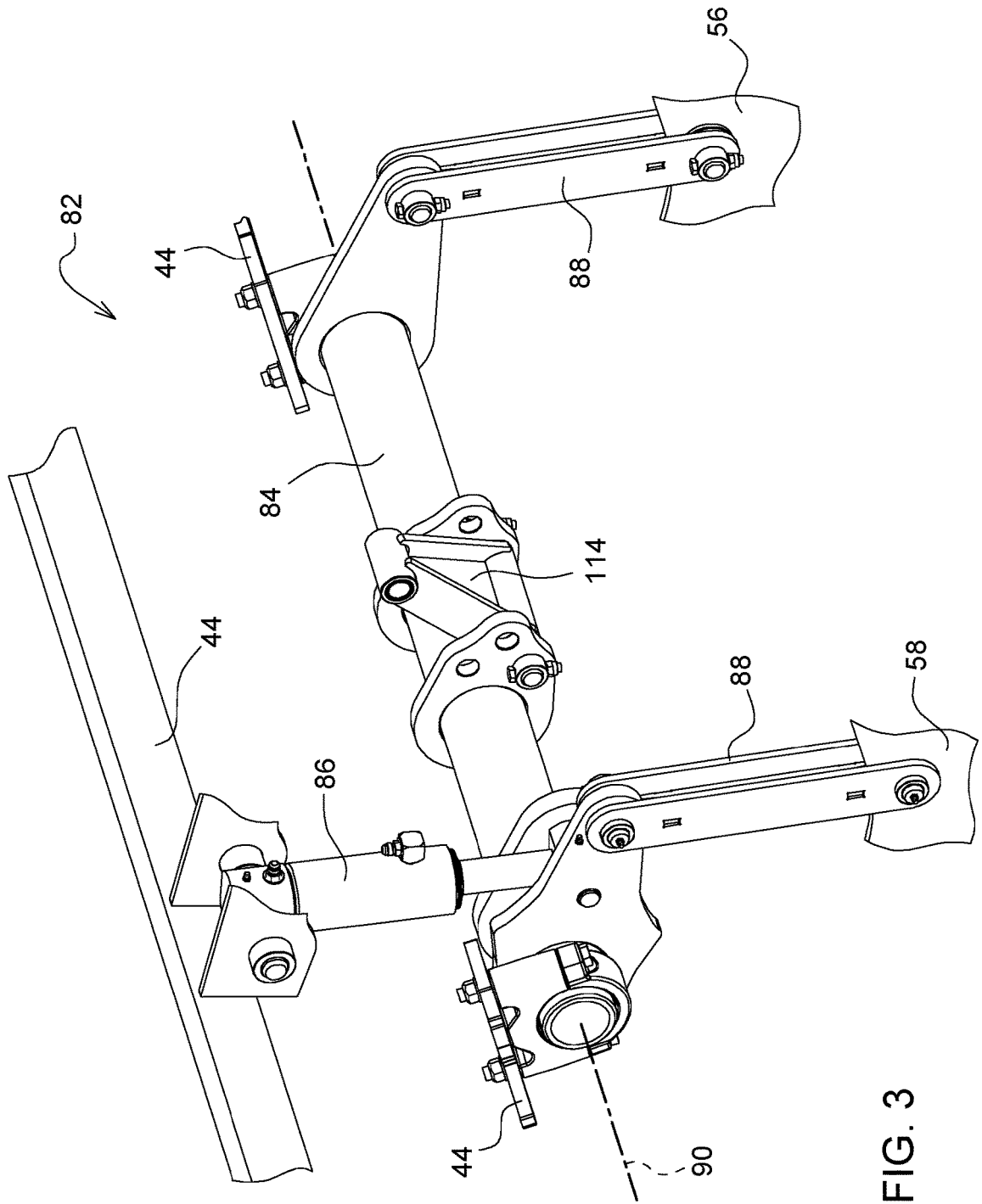
FIG. 3 is a perspective view showing a pivoter to pivot a basecutter relative to a frame (e.g., main frame)

Referring to FIG. 3, the inlet section 22 comprises a pivoter 82 coupled to the frame 44 and the basecutter 26 to pivot the basecutter 26 relative to the frame 44 about the pivot axis 50. The pivoter 82 comprises a rotary member 84, an actuator 86, a first side link 88, and a second side link 88. The rotary member 84 is coupled rotatably to the frame 44 for rotation relative to the frame 44 about an axis of rotation 90. The rotary member 84 comprises a rotatable shaft (e.g., a tube) and a number of mounting ears fixed to and extending radially from the shaft. The shaft defines the axis 90, and comprises opposite end portions mounted to the frame 44 via respective journal bearings comprising a first journal bearing mounted to a first portion of the frame 44 and a second journal bearing mounted to a second portion of the frame 44.

The actuator 86 is operably coupled to the rotary member 84 to rotate the rotary member 84 about its axis of rotation 90, and, in so doing, to pivot the basecutter 26 relative to the frame 44 about the pivot axis 50 to raise or lower the basecutter 26. As such, the actuator 86 is operably coupled to the basecutter 26, and the rotary member 84 is coupled to the basecutter 26.

The actuator 86 is coupled pivotally to the frame 44 and the rotary member 84. The actuator 86 is coupled pivotally to an upper portion of the frame 44. The mounting ears of the rotary member 84 comprise a first mounting ear and a second mounting ear, the first and second mounting ears positioned near a first end portion of the shaft. The actuator 86 is coupled pivotally (e.g., pinned) to the first and second mounting ears. The actuator 86 is configured, for example, as a linear actuator (e.g., hydraulic cylinder).

The first and second side links 88 interconnect the rotary member 84 and the frame 47. The first side link 88 is coupled pivotally to the rotary member 84 and the first side wall 56 of the frame 47. The first side link 88 is coupled pivotally to the first mounting ear of the rotary member 84 (e.g., pinned to the first mounting ear), which projects radially farther than the second mounting ear relative to the axis 90 for mounting of the link 88 to the first mounting ear. The second side link 88 is coupled pivotally to the rotary member 84 and the second side wall 58 of the frame 47. The second side link 88 is coupled pivotally (e.g., pinned) to a third mounting ear of the mounting ears of the rotary member 84, the third mounting ear positioned near a second end portion of the shaft opposite to the first end portion thereof.

Referring to FIGS. 2 and 3, the basecutter 26 may be raised or lowered to accommodate row profile variation. Row profile (lateral cross-section perpendicular to row longitudinal axis) may vary within a row or between rows, as much as, for example, about eight inches (about 26 centimeters) between furrow bottom and row top although two inches (about 5 centimeters) may be more normal. A human operator may command operation of the actuator 86 to adjust the height of the basecutter 26 via, for example, an operator input device at the operator's station 36. In other embodiments, the actuator 86 may be commanded to operate automatically in response to one or more input signals. The basecutter pivots relative to the frame 44 about the pivot axis 50, or otherwise translates relative to the frame 44. The basecutter 26 may thus be raised or lowered in order to sever the sugarcane at its base.

The actuator 86 is operable to raise and lower the basecutter 26. Extension of the actuator 86 pivots the rotary member 84 relative to the frame 44 about the axis of rotation 90 so as to cause the frame 47 along with the basecutter 26, lower knockdown roller 30, and the feed rollers 68 mounted to the frame 47 to pivot in translation relative to the frame 44 about the pivot axis 50 in a lowering direction. Retraction of the actuator 86 pivots the rotary member 84 relative to the frame 44 about the axis of rotation 90 in an opposite direction so as to cause the frame 47 along with the basecutter 26, the lower knockdown roller 30, and the feed rollers 68 mounted to the frame 47 to pivot in translation relative to the frame 44 about the pivot axis 50 in a raising direction.

The harvester 20 comprises sway blocks mounted to the frame 44 to block lateral movement of the frame 47 during pivoting about the axis 50. The sway blocks comprise a sway block fixed to the first portion of the frame 44 in the inlet region of the frame 44 and a sway block fixed to the second portion of the frame 44 in the inlet region of the frame 44. Each sway block is fixed (e.g., bolted) to the respective portion of the frame 44 with a metal plate positioned therebetween against the sway block and the frame portion. Each sway block may be made, for example, of nylon plastic (e.g., nylon 6) which is self-lubricating and has high wear resistance (e.g., available as NYLATRON®).

Figure 4:
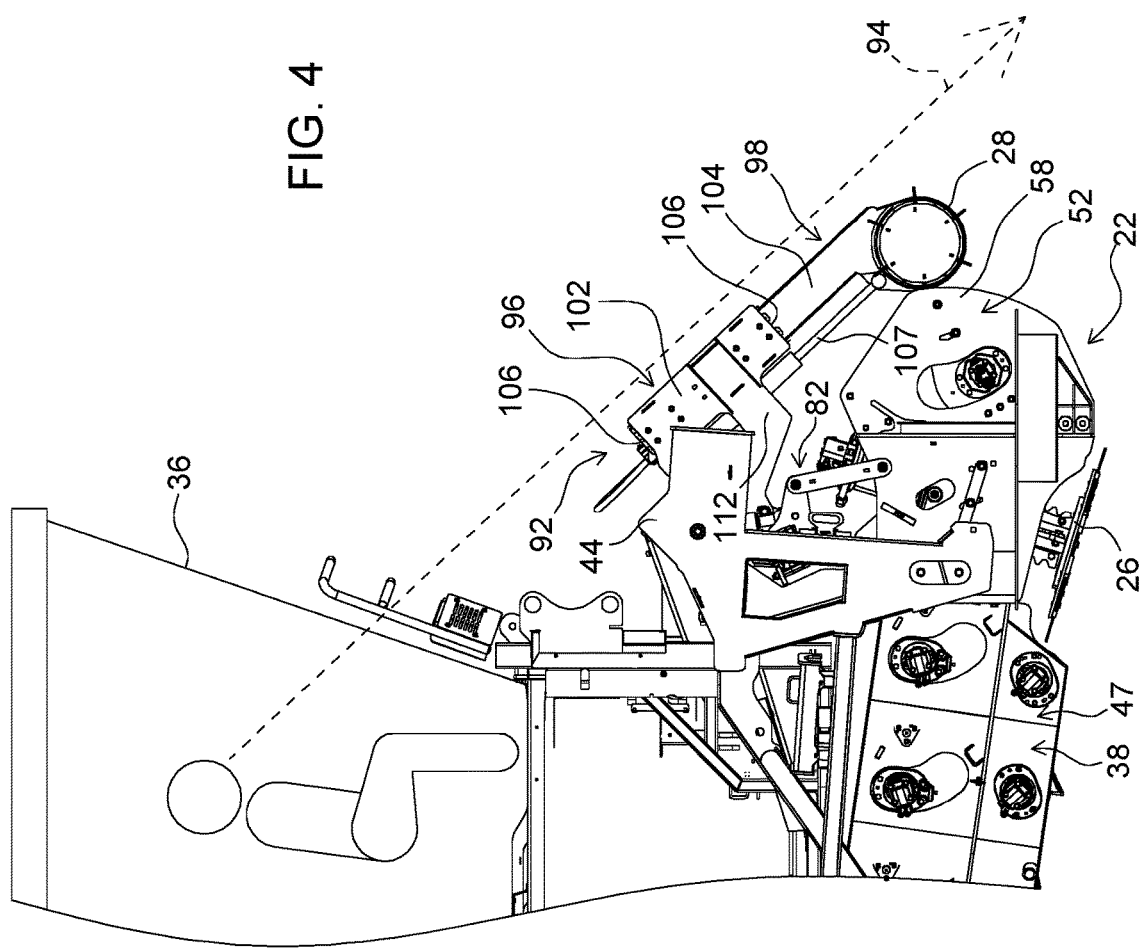
FIG. 4 is a side elevation view showing an upper knockdown roller mounted to a telescopic roller support.

Referring to FIG. 4, the aggressiveness of the upper knockdown roller 28 with respect to the sugarcane in the row 12 is adjustable. For example, if the sugarcane is standing, an operator may wish to raise the upper knockdown roller 28 to decrease its aggressiveness so as not to break the sugarcane with the upper knockdown roller 28. If the sugarcane is leaning or lying down, the operator may wish to lower the upper knockdown roller 28 to increase its aggressiveness. The operator may change the aggressiveness of the upper knockdown roller 28 via an operator input device (e.g., momentary toggle switch biased to neutral) at the operator's station 36.

The inlet section 22 comprises a telescopic roller support 92 mounted to the frame 44. The upper knockdown roller 28 is mounted to the roller support 92 of the inlet section 22. The roller support 92 is configured to telescope to cause linear movement of the upper knockdown roller 28 relative to the frame 44 and the basecutter 26. As such, the upper knockdown roller 28 is mounted for translation relative to the frame 44 and the basecutter 26, and such translation is independent of translation of the basecutter 26 relative to the frame 44. The telescopic design promotes operator visibility of crop engagement by the upper knockdown roller 28, as indicated by a line of sight 94.

Figure 5:
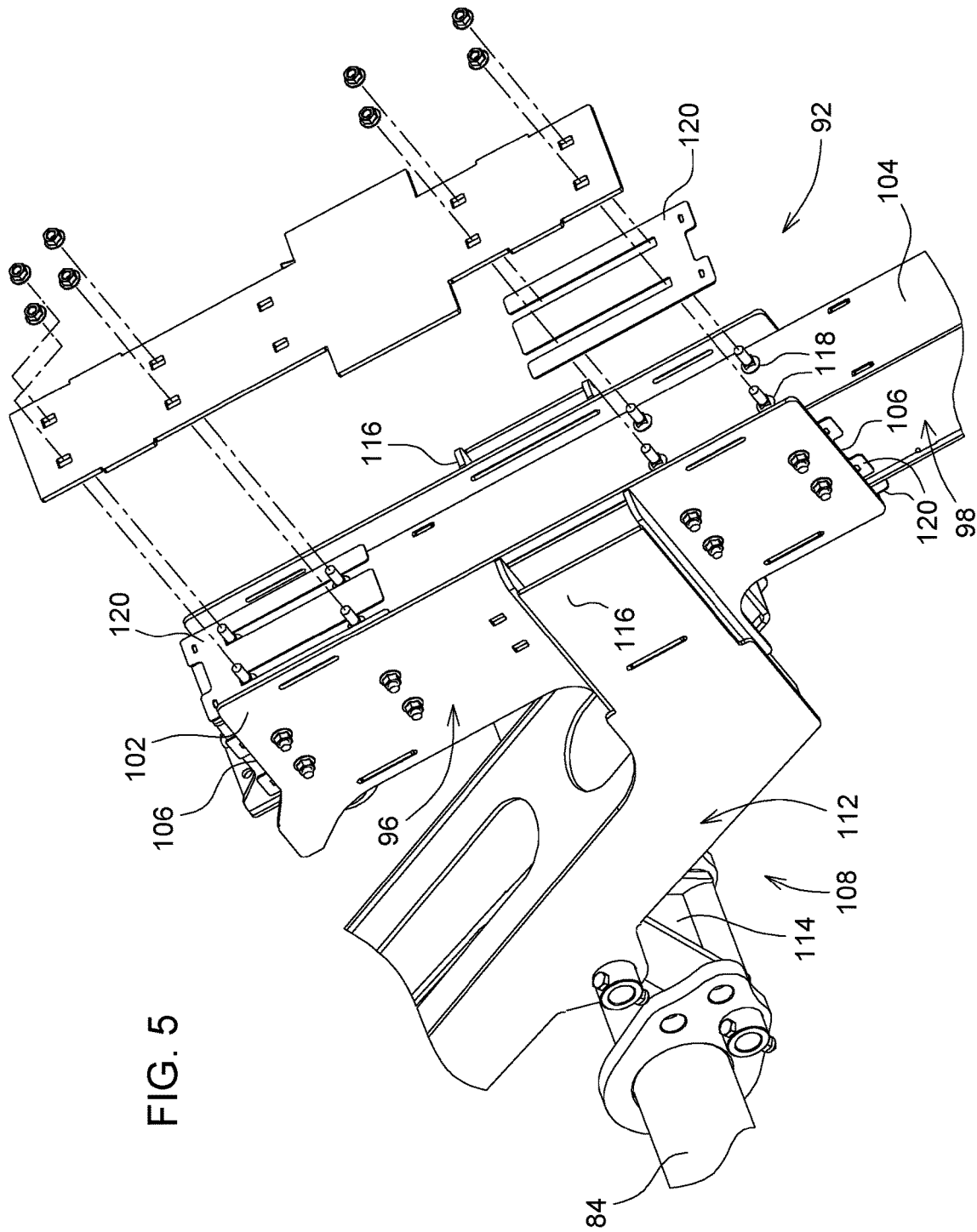
FIG. 5 is an enlarged, partially exploded view showing shims and positioner bolts to position a support arm of the roller support within a sleeve of the roller support.
Figure 6:
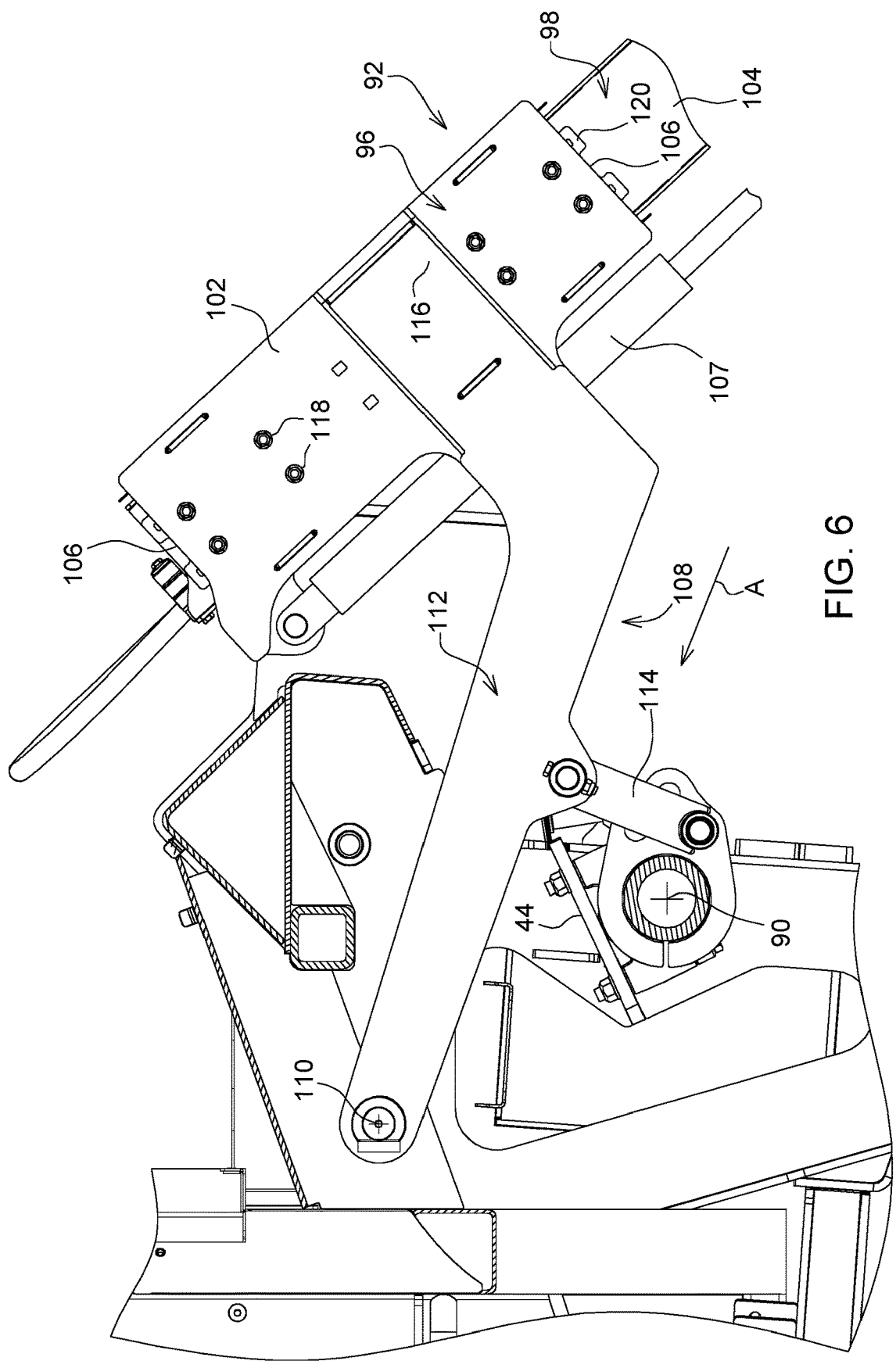
FIG. 6 is a sectional view taken along lines 6-6 of FIG. 2 through a rotary member (with a link kept in solid), with portions broken away, showing a synchronizer to maintain a position of the upper knockdown roller relative to the basecutter.

Referring to FIGS. 5 and 6, the roller support 92 comprises a first telescopic member 96 and a second telescopic member 98. The second telescopic member 98 is positioned in telescopic relation with the first telescopic member 96. The upper knockdown roller 28 is mounted to an end portion 100 of the second telescopic member 98. The first telescopic member 96 comprises a sleeve 102 mounted to the frame 44, and the second telescopic member 98 comprises a support arm 104 received by the sleeve 102 in telescopic relation thereto.

The support arm 104 is positioned for linear movement within the sleeve 102. The sleeve 102 comprises a first aperture 106 at a first end portion of the sleeve 102 and a second aperture 106 at an opposite second end portion of the sleeve 12, and the support arm 104 is positioned within the first aperture 106 and the second aperture 106 for movement therein.

The support arm 104 fits within the sleeve 102. Illustratively, each of the sleeve 102 and the support arm 104 comprises a box section configuration, with the box section configuration of the support arm 104 fitting within the box section configuration of the sleeve 102.

The sleeve 102 comprises a top wall, a bottom wall, a first side wall, and a second side wall. Each of the top and bottom walls comprises a number tabs (e.g., three) extending laterally from each of its two side edges, and each tab extends into and is fixed (e.g., welded) to a corresponding slot in the respective side wall of the sleeve 102. Each of the middle tabs of the top wall extends through and is fixed (e.g., welded) to a slot in the corresponding side wall to close an upper portion of a respective hand 116 of a pivot arm 112. Each of the middle tabs of the bottom wall extends through and is fixed (e.g., welded) to a slot in the corresponding side wall and necks down to a secondary tab which extends into and is fixed (e.g., welded) to a slot of an outer wall of the respective hand 116. The first and second side walls extend into and form part of the pivot arm 112.

The support arm 104 comprises a top wall, a bottom wall, a first side wall, and a second side wall. Each of the first and second side walls comprises a number of tabs along its upper and lower edges, and each tab extends into and is fixed (e.g., welded) to a corresponding slot in the respective top or bottom wall of the support arm 104.

Referring to FIG. 5, the roller support 92 comprises a number of positioner bolts 118 and a number of shims 120. The positioner bolts 118, configured similar to one another, cooperate to position the support arm 104 within the sleeve 102. The positioner bolts 118 extend through a respective wall of the sleeve 102 so as to extend a distance into the interior region of the sleeve 102. The shims 120, configured similar to one another, help to determine that distance. Each positioner bolt 118 comprises a conical head positioned in the interior region of the sleeve 102 and a square neck positioned along the shank of the bolt between the conical head and the threads. The square neck is positioned in and mates with a corresponding square aperture in the respective wall of the sleeve 102. One or more shims 120 are positioned between the conical head and the respective wall through which the positioner bolt 118 extends in order to position an end surface of the conical head in the interior region for contact with the support arm 104 to position the support arm 104 in the sleeve 102. There are, for example, two shim mounting locations along each of the top, bottom, and first and second side walls of the sleeve 102. Each shim mounting location may have one or more shims 120. Each shim 120 comprises two parallel blind slots. Two positioner bolts 118 are positioned in each blind slot, for a total of, for example, four positioner bolts 118 associated with each shim mounting location.

Referring to FIGS. 2 and 4, the upper knockdown roller 28 is mounted to the support arm 104. The support arm 104 comprises a yoke at an end portion of the support arm 104. A housing of the upper knockdown roller 28 is fixed (e.g., welded) to the yoke. The motor body of a first motor (e.g., hydraulic motor) (not shown) and the motor body of a second motor (e.g., hydraulic motor) (not shown) are positioned within and mounted (e.g., bolted) to the housing. The first motor rotates a first side of the upper knockdown roller 28, and the second motor rotates a second side of the upper knockdown roller 28. The first and second motors are fluidly coupled to one another (e.g., coupled in series). A number of hoses (e.g., hydraulic hoses) associated with the first and second motors extend into and within the support arm 104.

Referring to FIGS. 1, 4, and 6, the harvester 20 comprises an actuator 107 (shown generally diagrammatically). The actuator 107 is configured to cause telescopic movement of the roller support 92. The actuator 107 is coupled to the sleeve 102 and the support arm 104. For example, the actuator 107 is coupled to an ear of the sleeve 102 and an ear of the support arm 104 (e.g., pinned to each ear as shown generally diagrammatically). The actuator 107 is configured, for example, as a hydraulic cylinder.

The roller support 92 is configured to promote operator visibility of crop engagement by the upper knockdown roller 28 from the operator's station 36. The roller support 92 is positioned largely rearwardly of the upper knockdown roller 28, promoting the operator's angle of vision to crop engagement.

Referring to FIG. 6, the inlet section 22 comprises a synchronizer 108 configured to translate the upper knockdown roller 28 in unison with the basecutter 26 so as to maintain a position of the upper knockdown roller 28 relative to the basecutter 26 upon translation of the basecutter 26 relative to the frame 44. As the basecutter height is adjusted relative to the frame 44, the synchronizer 108 maintains the upper knockdown roller 28 in the same position relative to the basecutter 26 throughout the range of motion of the basecutter 26. The axis of rotation of the upper knockdown roller 28 stays in the same position relative to the axes of rotation of the basecutter 26 (i.e., the axes of rotation of the two cutting disks of the basecutter 26). The synchronizer 108 may be configured to so maintain the position of the upper knockdown roller 28 relative to the basecutter 26 mechanically, electrically, hydraulically, or a combination of one or more of these.

In the illustrated example, the synchronizer 108 is coupled to the frame 44 and the pivoter 82 to pivot the upper knockdown roller 28 relative to the frame 44 about a pivot axis 110 in response to operation of the pivoter 82. The synchronizer 108 supports the upper knockdown roller 28. The synchronizer 108 comprises, for example, a pivot arm 112 and a synchronizer link 114. The pivot arm 112 is coupled pivotally to the frame 44 to pivot relative to the frame 44 about the pivot axis 110. The pivot arm 112 supports the upper knockdown roller 28 to pivot with the pivot arm 112 relative to the frame 44 about the pivot axis 110. The upper knockdown roller 28 is mounted to the frame 44 via the pivot arm 112 and the roller support 92, and, as such, is an example in which the upper knockdown roller 28 is mounted for translation relative to the frame 44.

The roller support 92 is mounted to the pivot arm 112. The sleeve 102 is fixed to the pivot arm 112. The pivot arm 112 comprises a first hand 116 and a second hand 116. The sleeve 102 is positioned between the first hand 116 and the second hand 116. The sleeve 102 is fixed to (e.g., welded) and held by the first and second hands 116.

Referring to FIG. 7, the synchronizer link 114 is coupled pivotally to the rotary member 84 and the pivot arm 112. The synchronizer link 114 is positioned axially between the first side link 88 and the second side link 88 relative to the axis of rotation 90. The link 114 is coupled pivotally (e.g., pinned) to a pair of mounting ears of the rotary member 84 extending radially outwardly from the rotatable shaft of the rotary member 84, and coupled pivotally (e.g., pinned) to a pair of mounting ears of the pivot arm 112.

The synchronizer link 114 pivots the pivot arm 112 and the upper knockdown roller 28 supported thereby about the pivot axis 110 in response to rotation of the rotary member 84 about the axis of rotation 90 due to operation of the actuator 86 to raise or lower the basecutter 26. Extension of the actuator 86 rotates the rotary member 84 about the axis of rotation 90 to pivot the pivot arm 112 about the pivot axis 110 so as to lower the upper knockdown roller 28 with the basecutter 26 to maintain the position of the upper knockdown roller 28 relative to the basecutter 26. Retraction of the actuator 86 rotates the rotary member 84 in an opposite direction about the axis of rotation 90 to pivot the pivot arm 112 in an opposite direction about the pivot axis 110 so as to raise the upper knockdown roller 28 with the basecutter 26 to maintain the position of the upper knockdown roller 28 relative to the basecutter 26. As such, the actuator 86 is operably coupled to the basecutter 26 and the synchronizer 108.

The harvester 20 may be a single row or multi-row sugarcane harvester. In the illustrated embodiment, the harvester 20 is a two-row harvester, comprising two inlet sections 22, one of which is shown. The first inlet section 22 is configured to feed a first mat of severed sugarcane from a first row into the first feed train 38, and the second inlet section 22 is configured to feed a second mat of severed sugarcane from a second row into a second feed train (not shown) configured similar to the first feed train 38. The first feed train 38 and the second feed train merge into the feed train 42, which is configured to advance the first and second mats received respectively from the first feed train 38 and the second feed train to the chopping section 34. The first feed train 38 and the second feed train may be symmetrical relative to a fore-aft axis of the harvester 20, which may be a centerline of the harvester 20 and the feed section 32. Nonetheless, it is to be understood that each of the synchronizer 108 and the telescopic roller support 92 may be used with a single or multi-row sugarcane harvester.

It is to be understood that, while the synchronizer 108 is illustrated for use with the telescopic roller support 92, in other embodiments the synchronizer 108 may be configured for use with a non-telescopic roller support and still provide provide the synchronizing function between the upper knockdown roller 28 and the basecutter 26.

It is to be understood that the telescopic roller support 92 may be configured for use without the synchronizer 108 or other configuration of a synchronizer.

Welds and threads are not shown in the drawings for ease of illustration, but their presence is to be understood.

While the disclosure has been illustrated and described in detail in the drawings and foregoing description, such illustration and description is to be considered as an example and not restrictive in character, it being understood that an illustrative embodiment has been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A sugarcane harvester, comprising
a frame,
a basecutter coupled to the frame for translation relative to the frame,
a knockdown roller mounted for translation relative to the frame, and
a synchronizer configured to translate the knockdown roller in unison with the basecutter so as to maintain a position of the knockdown roller relative to the basecutter upon translation of the basecutter relative to the frame, and
a rotary member coupled rotatably to the frame for rotation relative to the frame about an axis of rotation and an actuator operably coupled to the rotary member, wherein the synchronizer comprises a pivot arm coupled pivotally to the frame to pivot relative to the frame about a pivot axis and supporting the knockdown roller and a synchronizer link coupled pivotally to the rotary member and the pivot arm to pivot the pivot arm and the knockdown roller supported thereby about the pivot axis in response to rotation of the rotary member about the axis of rotation due to operation of the actuator to raise or lower the basecutter.

2. The sugarcane harvester of claim 1, comprising another frame coupled pivotally to the frame, a first side link coupled pivotally to the rotary member and a first side wall of the other frame, and a second side link coupled pivotally to the rotary member and a second side wall of the other frame, wherein the basecutter is mounted to and between the first side wall and the second side wall.

3. The sugarcane harvester of claim 2, wherein the synchronizer link is positioned axially between the first side link and the second side link relative to the axis of rotation.

4. A sugarcane harvester, comprising
a frame, a basecutter coupled to the frame for translation relative to the frame, a knockdown roller mounted for translation relative to the frame, a synchronizer configured to translate the knockdown roller in unison with the basecutter so as to maintain a position of the knockdown roller relative to the basecutter upon translation of the basecutter relative to the frame, and a pivoter coupled to the frame and the basecutter to pivot the basecutter relative to the frame about a first pivot axis, wherein the synchronizer is coupled to the frame and the pivoter to pivot the knockdown roller relative to the frame about a second pivot axis in response to operation of the pivoter, and the pivoter comprises a rotary member coupled rotatably to the frame for rotation relative to the frame about an axis of rotation and an actuator operably coupled to the rotary member.

5. The sugarcane harvester of claim 4, wherein the synchronizer comprises a pivot arm coupled pivotally to the frame to pivot relative to the frame about the second pivot axis and supporting the knockdown roller to pivot with the pivot arm relative to the frame about the second pivot axis and a synchronizer link coupled pivotally to the rotary member and the pivot arm.

* * * * *